US011437710B2

(12) United States Patent
Liao et al.

(10) Patent No.: US 11,437,710 B2
(45) Date of Patent: Sep. 6, 2022

(54) ELECTRONIC DEVICE HAVING MULTIPLE ANTENNAS AND ANTENNA CONFIGURATION METHOD THEREOF

(71) Applicant: ASUSTeK COMPUTER INC., Taipei (TW)

(72) Inventors: Kuo-Chu Liao, Taipei (TW); Wei-Cheng Lo, Taipei (TW); Chuan-Chien Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 234 days.

(21) Appl. No.: 16/860,478

(22) Filed: Apr. 28, 2020

(65) Prior Publication Data

US 2020/0358164 A1    Nov. 12, 2020

(30) Foreign Application Priority Data

May 6, 2019    (TW) .................................. 108115630

(51) Int. Cl.
| | | |
|---|---|---|
| *H01Q 1/24* | (2006.01) | |
| *H01Q 1/22* | (2006.01) | |
| *G06F 3/0488* | (2022.01) | |
| *H01Q 21/28* | (2006.01) | |

(52) U.S. Cl.
CPC ........... *H01Q 1/243* (2013.01); *G06F 3/0488* (2013.01); *H01Q 1/2208* (2013.01); *H01Q 21/28* (2013.01); *G06F 2203/04104* (2013.01)

(58) Field of Classification Search
CPC ....... H01Q 21/28; H01Q 1/2208; H01Q 1/243
See application file for complete search history.

(56) References Cited

U.S. PATENT DOCUMENTS

| | | | | |
|---|---|---|---|---|
| 8,805,459 B2* | 8/2014 | Pohlabeln | .............. | H01Q 21/28 |
| | | | | 455/575.1 |
| 9,207,742 B2 | 12/2015 | Lin | | |
| 2013/0169507 A1* | 7/2013 | Ko | .......................... | H01Q 1/243 |
| | | | | 343/876 |
| 2018/0048054 A1 | 2/2018 | Song | | |

FOREIGN PATENT DOCUMENTS

| | | |
|---|---|---|
| CN | 102948016 A | 2/2013 |
| CN | 103856224 A1 | 6/2014 |
| CN | 205375292 U | 7/2016 |
| CN | 107425888 A | 12/2017 |
| CN | 108966296 A | 12/2018 |
| TW | M353493 U | 3/2009 |

(Continued)

*Primary Examiner* — Graham P Smith
(74) *Attorney, Agent, or Firm* — McClure, Qualey & Rodack, LLP (57) ABSTRACT

An electronic device having multiple antennas and an antenna configuration method are provided. The antenna configuration method includes: controlling a communication module of an electronic device to electrically connect to a main antenna of the electronic device; determining whether an operating state of the electronic device conforms to a preset usage situation; and controlling the communication module to electrically connect to an auxiliary antenna of the electronic device when the operating state conforms to the preset usage situation, so that the communication module transmits and receives the radio frequency signal by the auxiliary antenna.

14 Claims, 6 Drawing Sheets

(56) References Cited

FOREIGN PATENT DOCUMENTS

| TW | 201328206 A | 7/2013 |
| TW | I475374 B | 8/2014 |
| TW | I475374 B | 3/2015 |
| TW | 201622236 A | 6/2016 |
| TW | 201810803 A | 3/2018 |

* cited by examiner

ELECTRONIC DEVICE HAVING MULTIPLE ANTENNAS AND ANTENNA CONFIGURATION METHOD THEREOF

CROSS-REFERENCE TO RELATED APPLICATION

This application claims the priority benefit of Taiwan applications serial No. 108115630, filed on May 6, 2019. The entirety of the above-mentioned patent application is hereby incorporated by reference herein and made a part of specification.

BACKGROUND OF THE INVENTION

Field of the Invention

The invention relates to an electronic device having multiple antennas and an antenna configuration method thereof.

Description of the Related Art

Generally, a mobile communication device has a wireless communication system and a separate antenna for a wireless communication system, and the wireless communication system transmits and receives the radio frequency signal through a separate antenna. However, the functions of mobile communication devices are varies and becomes more powerful, and the applications of mobile communication devices becomes more widespread. For example, a user may watch a movie for a long time through a mobile communication device or operate the application for a long time. When the user operates the mobile communication device in different operation modes, different antenna shielding problems may occur. Therefore, a mobile communication device with only one antenna has poor communication performance.

BRIEF SUMMARY OF THE INVENTION

According to the first aspect, an antenna configuration method is provided. The antenna configuration method includes: controlling a communication module of an electronic device to electrically connect to a main antenna of the electronic device; determining whether an operating state of the electronic device conforms to a preset usage situation; and controlling the communication module to electrically connect to an auxiliary antenna of the electronic device when the operating state conforms to the preset usage situation, so that the communication module transmits and receives the radio frequency signal by the auxiliary antenna.

According to the second aspect, an electronic device having multiple antennas is also provided. The electronic device comprises: a main antenna, located in the electronic device; an auxiliary antenna; a switching circuit, coupled with the main antenna and the auxiliary antenna; a communication module, coupled with the switching circuit; and a control circuit, coupled with the switching circuit, for controlling the switching circuit to electrically connect to the communication module and the main antenna, determining whether an operating state of the electronic device conforms to a preset usage situation, wherein when the operating state conforms to the preset usage situation, the control circuit controls the communication module to electrically connect to an auxiliary antenna of the electronic device, so that the communication module transmits and receives the radio frequency signal by the auxiliary antenna.

These and other features, aspects and advantages of the present invention will become better understood with regard to the following description, appended claims, and accompanying drawings.

DETAILED DESCRIPTION OF THE EMBODIMENTS

Figure 1:
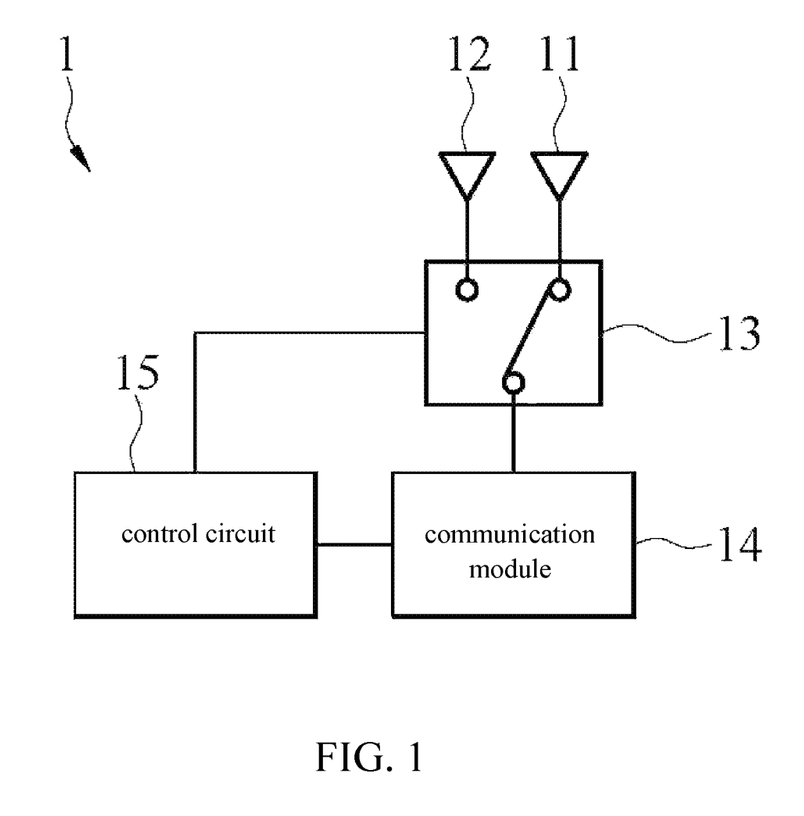
FIG. 1 is a circuit block diagram of an electronic device having multiple antennas according to an embodiment.

FIG. 1 is a circuit block diagram of an electronic device having multiple antennas according to an embodiment. The electronic device 1 includes a main antenna 11, an auxiliary antenna 12, a switching circuit 13, a communication module 14 and a control circuit 15. The electronic device 1 includes one communication module 14 in FIG. 1, which is for example and is not limited thereto. In an embodiment, the electronic device 1 includes two or more communication module. The switching circuit 13 is coupled between the main antenna 11 and the communication module 14, or is coupled between the auxiliary antenna 12 and the communication module 14. The switching circuit 13 is coupled to the control circuit 15 and is controlled by the control circuit 15. The control circuit 15 controls the switching circuit 13 in real time to couple the main antenna 11 or the auxiliary antenna 12 according to an operating state of the electronic device 1, so that the communication module 14 correspondingly transmits and receives the radio frequency signal through the main antenna 11 or the auxiliary antenna 12 according to the operating state of the electronic device 1. In an embodiment, the communication module 14 includes an electronic component that supports communication transmission, such as a modem, a radio frequency front-end transceiver circuit, or the like.

Figure 2:
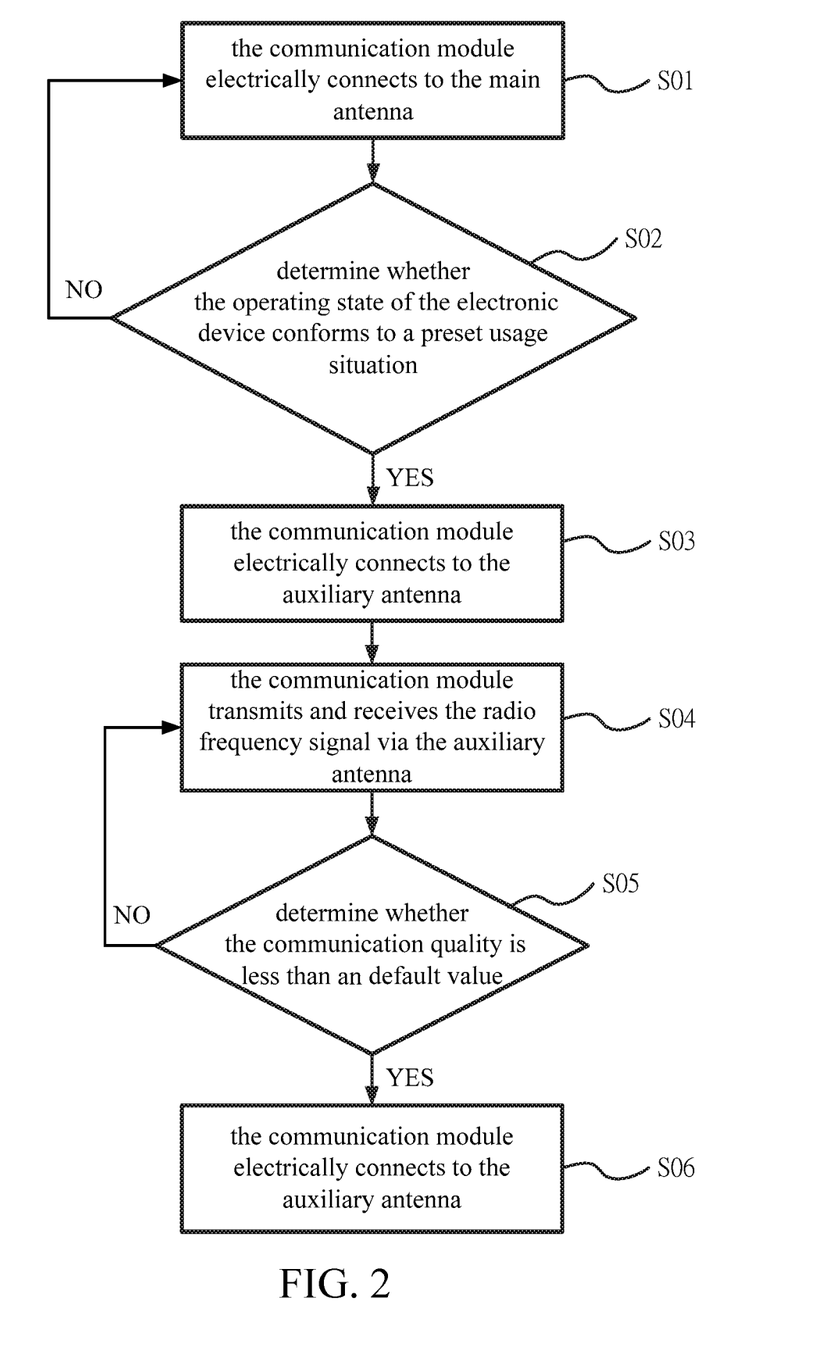
FIG. 2 is a flowchart of an antenna configuration method according to an embodiment.

In detail, please also refer to FIG. 2. FIG. 2 is a flowchart of an antenna configuration method according to an embodiment. In operation, the control circuit 15 controls the communication module 14 to electrically connect to the main antenna 11 in the electronic device 1 (step S01). Next, the control circuit 15 determines whether the operating state of the electronic device 1 conforms to a preset usage situation (step S02). When the operating state of the electronic device 1 conforms the preset usage situation (the determination result is "YES"), which means that the radio frequency signal transmitted and received by the main antenna 11 in the preset usage situation decreases the communication quality of the electronic device 1. Therefore the control circuit 15 controls the switching circuit 13 to electrically connect to the auxiliary antenna 12, and the communication module 14 is switched to electrically connect to the auxiliary antenna 12 (step S03). The communication module 14 transmits and receives the radio frequency signal via the auxiliary antenna 12 (step S04), so that the electronic device 1 has a good communication quality. The preset usage situation is pre-designed for the electronic device 1, thus the control circuit 15 controls the switching circuit 13 to electrically connect the main antenna 11 or the auxiliary antenna 12 in real time according to the operating state of the electronic device 1 to transmit and receive the radio frequency signal.

In an embodiment, the switching circuit 13 is a single pole double throw switch, a single pole triple throw switch, a double pole double throw switch, or a multi-pole multi-throw switch. The communication module 14 supports WI-FI communication technology. In other embodiments, the communication module 14 supports communication technologies, such as LTE, 2G (GSM), 3G (WCDMA/TD-SCDMA/CDMA2000), 5G (NR), or supports positioning technology, such as Global Navigation Satellite System (GNSS).

Figure 3:
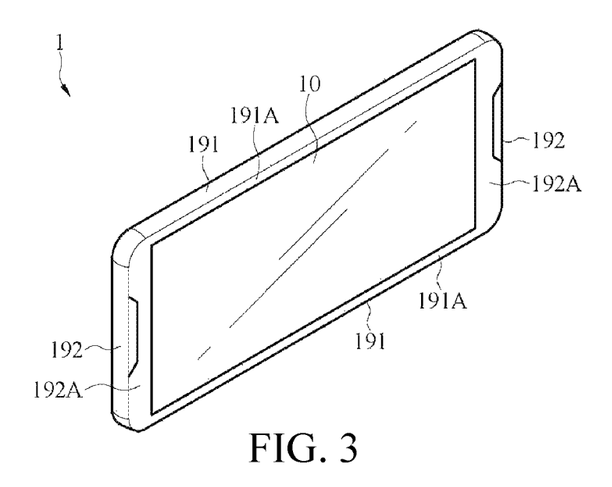
FIG. 3 is a schematic diagram showing the appearance of the electronic device of FIG. 1 according to an embodiment.

In an embodiment, as shown in FIG. 3, the electronic device 1 has at least one long side 191 and at least one short side 192. The main antenna 11 is located in the area 192A (hereinafter referred to as the first area 192A) of the electronic device 1 adjacent to the short side 192, and the auxiliary antenna 12 is located in the area 191A of the electronic device 1 adjacent to the long side 191 (hereinafter referred to as the second area 191A). In step S02, in an embodiment, the control circuit 15 determines whether the operating state of the electronic device 1 conforms to the preset usage situation, it means that the control circuit 15 determines whether the electronic device 1 is operating in a horizontal operation mode. In detail, when the electronic device 1 is operated in the horizontal operation mode, the situation is that the user is holding the short side 192 of the electronic device 1 by hands to operate the electronic device 1 in the horizontal operation mode. At this time, the main antenna 11 located in the first area 192A is shielded by the user's hand, causing a poor communication quality of the electronic device 1. Then, when the control circuit 15 determines that the electronic device 1 is operating in the horizontal operation mode, the control circuit 15 controls the switching circuit 13 to electrically connect the auxiliary antenna 12 and the communication module 14. The main antenna 11 of the first area 192A is replaced by the auxiliary antenna 12 located in the second area 191A to transmit and receive the radio frequency signal to enhance the communication quality of the electronic device 1.

In another embodiment, in step S02, in an embodiment, the control circuit 15 determines whether the operating state of the electronic device 1 conforms to the preset usage situation or not, means that the control circuit 15 not only determines whether the electronic device 1 is operating in a horizontal operation mode, but also determines whether the number of multi-touch signals from the touch screen 10 of the electronic device 1 within a preset time meets a default value (hereinafter referred to as the first default value). If both results are YES, it means that the user of the electronic device 1 operates an application by continuously touching the touch screen 10 with a plurality of fingers within the preset time. In this embodiment, the step of the control circuit 15 determines whether the operating state of the electronic device 1 conforms to the preset usage situation further includes that the control circuit 15 determines whether the electronic device 1 in the horizontal operation mode is held by both hands of the user, causing the main antenna 11 to be shielded. therefore, when the control circuit 15 determines that the electronic device 1 is operating in the horizontal operation mode and the number of the multi-touch signals from the touch screen 10 within the preset time meets the first default value, the control circuit 15 determines that the operating state of the electronic device 1 conforms to the preset usage situation (the determine result is "YES"), and then the control circuit 15 controls the switching circuit 13 to electrically connect to the auxiliary antenna 12, triggering the communication module 14 to transmit and receive the radio frequency signal via the auxiliary antenna 12 located in the second area 191A instead of the main antenna 11 located at the first area 192A.

In another embodiment, in step S02, the control circuit 15 also determines whether the startup code of an application of the electronic device 1 includes a preset character string to determine whether the user holds the electronic device with both hands and executes the application or not. For example, when the control circuit 15 determines that the startup code includes the preset character string of "game", the control circuit 15 determines that the operating state of the electronic device 1 conforms to the preset usage situation (the determine result is "YES"). At this time, the control circuit 15 controls the switching circuit 13 to electrically connect to the auxiliary antenna 12, and the communication module 14 transmits and receives the radio frequency signal via the auxiliary antenna 12 located in the second area 191A.

Figure 4:
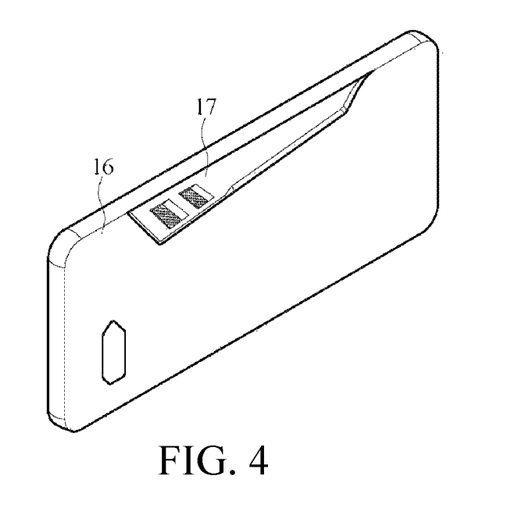
FIG. 4 is a schematic diagram showing the appearance of an electronic device having a metal heat component according to an embodiment.

Please refer to FIG. 4. In one embodiment, the electronic device 1 includes a back cover 16 and a metal heat component 17. The metal heat component 17 is located at the back cover 16. The auxiliary antenna 12 is externally disposed on the metal heat component 17. When the control circuit 15 controls the switching circuit 13 to electrically connect to the auxiliary antenna 12, the communication module 14 transmits and receives the radio frequency signal via the auxiliary antenna 12 externally disposed on the metal heat component 17 to avoid that the main antenna 11 located in the electronic device 1 is shielded by the user's hands and reduces the communication quality of the electronic device 1.

Figure 5:
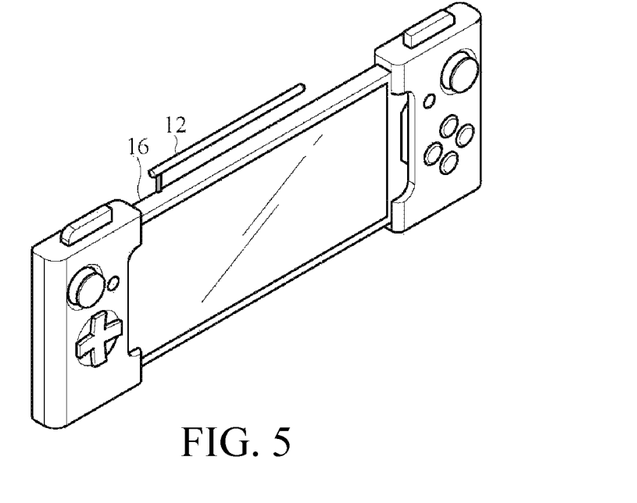
FIG. 5 is an external appearance view of an auxiliary antenna of an electronic device according to an embodiment.

Please refer to FIG. 5. In one embodiment, the auxiliary antenna 12 is externally connected to the back cover 16 of the electronic device 1, and the auxiliary antenna 12 is moveable relative to the back cover 16 and is in an extension state. FIG. 5 illustrates the auxiliary antenna at the extension state 12. Then, in step S02, the control circuit 15 determining whether the operating state of the electronic device 1 conforms to the preset usage situation means that the control circuit 15 determines whether the auxiliary antenna 12 is in the extension state. In one embodiment, the auxiliary antenna 12 in the extension state represents that the user of the electronic device 1 wants to use the auxiliary antenna 12 to enhance the communication quality of the electronic device 1. Therefore, when the control circuit 15 determines that the auxiliary antenna 12 is in the extension state, the control circuit 15 determines that the operating state of the electronic device 1 conforms to the preset usage situation (the determination result is "YES"). Meanwhile, the control circuit 15 controls the communication module 14 to electrically connect to the auxiliary antenna 12, and causes the communication module 14 to transmit and receive the radio frequency signal through the external auxiliary antenna 12. Thus, when the electronic device 1 is in the horizontal operation mode, and when the auxiliary antenna 12 is in the extension state, the control circuit 15 controls the communication module 14 to enhance the communication quality of the electronic device 1 by transmitting and receiving the radio frequency signal via the auxiliary antenna 12.

Please refer to FIG. 6 to FIG. 9. In an embodiment, the electronic device 1 is assembled to an expansion accessory 2, and the auxiliary antenna 12 is located on the expansion accessory 2. When the control circuit 15 controls the communication module 14 to electrically connect to the auxiliary antenna 12, the communication module 14 transmits and receives the radio frequency signal via the auxiliary antenna 12 external attached to the expansion accessory 2 to avoid that the communication quality of the electronic device 1 is affected when to the main antenna 11 located in the electronic device 1 is shielded.

Figure 6:
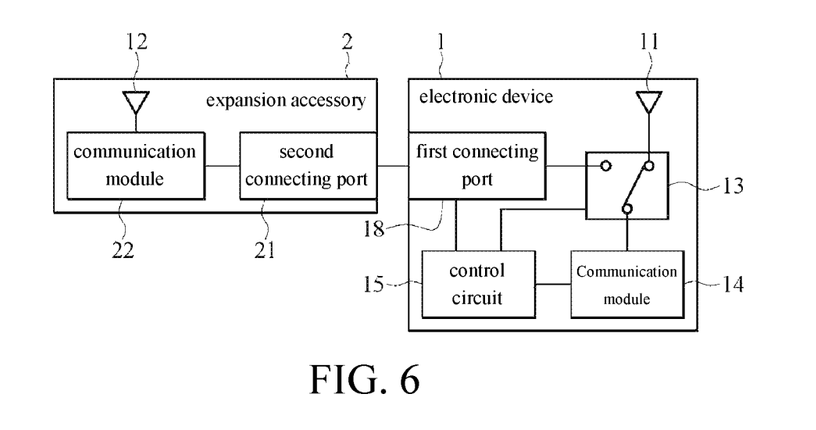
FIG. 6 is a circuit block diagram of an electronic device and an expansion accessory according to an embodiment.

As shown in FIG. 6, in detail, the electronic device 1 includes a connecting port 18 (hereinafter referred to as the first connecting port 18), and the switching circuit 13 is coupled to the first connecting port 18. The expansion accessory 2 includes another connecting port 21 (hereinafter referred to as the second connecting port 21) corresponding to the first connecting port 18, and the auxiliary antenna 12 located in the expansion accessory 2 is coupled to the second connecting port 21. When the electronic device 1 is combined with the expansion accessory 2, the first connecting port 18 is connected to the second connecting port 21. When the control circuit 15 determines that the auxiliary antenna 12 is coupled to the switching circuit 13 via the second connecting port 21 and the first connecting port 18, the control circuit 15 determines that the operating state of the electronic device 1 conforms to the preset usage situation. At this time, the control circuit 15 controls the communication module 14 to electrically connect to the auxiliary antenna 12 through the switching circuit 13, the first connecting port 18 and the second connecting port 21 to transmit and receive the radio frequency signal via the auxiliary antenna 12 that externally attached to the expansion accessory 2. In an embodiment, the auxiliary antenna 12 of the expansion accessory 2 is configured to transmit and receive high frequency signals. When the switching circuit 13 is electrically connected to the communication module 14 and the first connecting port 18, high radio frequency signals are transmitted to the communication module 14 via the second connecting port 21, the first connecting port 18 and the switching circuit 13.

As shown in FIG. 6, in another embodiment, the expansion accessory 2 further includes another communication module 22 coupled between the second connecting port 21 and the auxiliary antenna 12. The communication module 22 converts the radio frequency signal that received by the auxiliary antenna 12 into a digital signal, and transmits the digital signal to the electronic device via the second connecting port 21. Since the high radio frequency signal is converted to the digital signal of non-high frequency, the second connecting port 21 and the first connecting port 18 transmitting the digital signal requires no additional grounding pins corresponding to the high frequency signal, which increases the design flexibility of the electronic device 1 and enhances the compatibility between the expansion accessory 2 and other devices.

Figure 7:
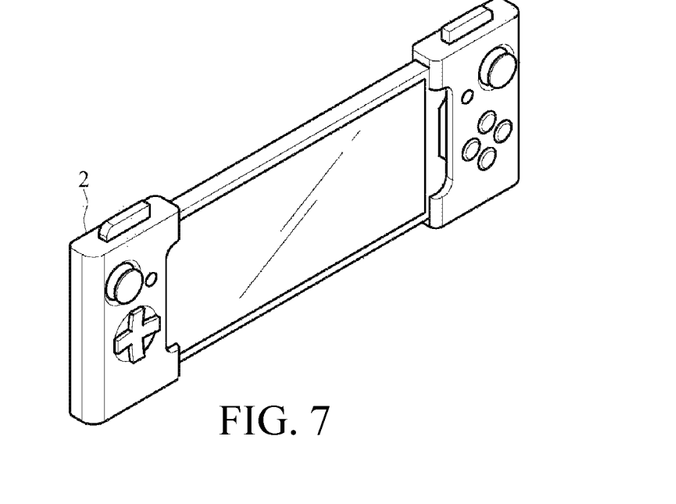
FIG. 7 is a schematic diagram of the appearance of the expansion accessory of FIG. 6 according to a first embodiment.
Figure 8:
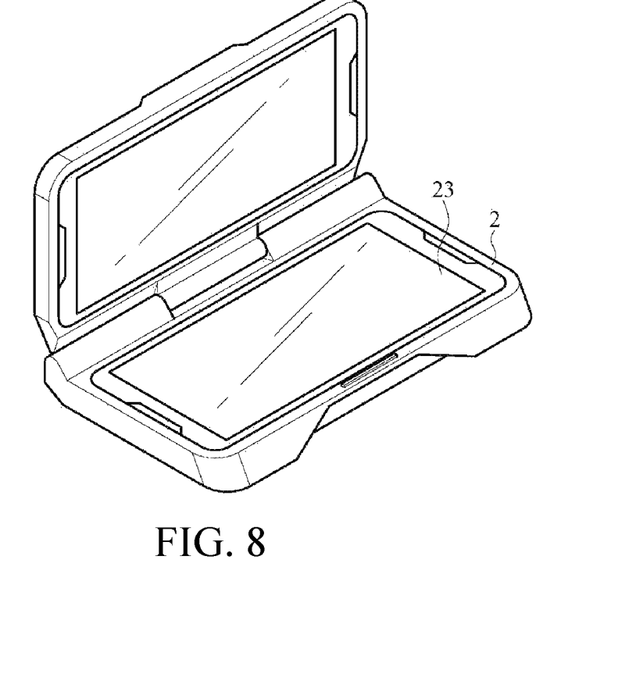
FIG. 8 is a schematic diagram of the appearance of the expansion accessory of FIG. 6 according to a second embodiment.
Figure 9:
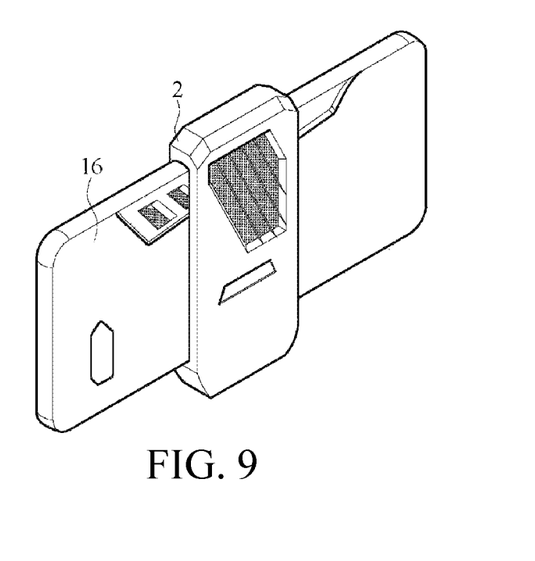
FIG. 9 is a schematic diagram of the appearance of the expansion accessory of FIG. 6 according to a third embodiment.

In an embodiment, the expansion accessory 2 is a game controller as shown in FIG. 7, the expansion accessory 2 is a base with an embedded screen 23 as shown in FIG. 8, and the expansion accessory 2 is a group of cooling fans that coupled to the back cover 16 of the electronic device 1 as shown in FIG. 9. Thus, the auxiliary antenna 12 is capable to be arranged in various types of the expansion accessory.

As shown in FIG. 2. In an embodiment, when the communication module 14 transmits and receives the radio frequency signal via the auxiliary antenna 12, the control circuit 15 further determines whether the communication quality of the electronic device 1 is less than another default value (hereinafter referred to as the second default value) (step S05), which further determines that whether the communication quality of the radio frequency signal transmitted and received via the auxiliary antenna 12 is better than that via the main antenna 11. When the control circuit 15 determines that the communication quality of the radio frequency signal transmitted and received by the auxiliary antenna 12 is less than the second default value (the determination result is "YES"), it is represented that transmitting and receiving the radio frequency signal via the auxiliary antenna 12 does not improve the communication quality of the electronic device 1. Hence, the control circuit 15 controls the communication module 14 to switch to electrically connected to the main antenna 11 (step S06), and causes the communication module 14 to transmit and receive the radio frequency signal through the main antenna 11, which avoids the communication quality reduction due to the radio frequency signal transmitted and received by the auxiliary antenna 12.

In summary, the electronic device having multiple antennas and the antenna configuration method thereof are provided herein. The communication module transmits and receives the radio frequency signal through the auxiliary antenna or the main antenna according to whether the operating state of the electronic device conforms to the preset usage situation in real time, so that the electronic device has good communication quality in different usage situations.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An antenna configuration method, comprising:
controlling a communication module of an electronic device to electrically connect to a main antenna of the electronic device;
determining whether an operating state of the electronic device conforms to a preset usage situation;
controlling the communication module to electrically connect to an auxiliary antenna of the electronic device when the operating state conforms to the preset usage situation, so that the communication module transmits and receives the radio frequency signal by the auxiliary antenna;
determining whether a communication quality of the electronic device is less than a second default value when the communication module transmits and receives the radio frequency signal via the auxiliary antenna; and
controlling the communication module to electrically connect to the main antenna when the operating state meets the preset usage situation and the communication quality is less than the second default value.

2. The antenna configuration method according to claim 1, the step of determining whether the operating state conforms to the preset usage situation further comprising:
   determining whether the electronic device is operated in a horizontal operation mode.

3. The antenna configuration method according to claim 2, the step of determining whether the operating state conforms to the preset usage situation further comprising:
   determining whether the number of multi-touch signals of a touch screen of the electronic device within a preset time meets with a first default value.

4. The antenna configuration method according to claim 1, the step of determining whether the operating state conforms to the preset usage situation further comprising:
   determining whether an startup code of an application of the electronic device includes a preset character string.

5. The antenna configuration method according to claim 1, the step of determining whether the operating state conforms to the preset usage situation further comprising:
   determining whether the auxiliary antenna is in an extension state relative to the back cover of the electronic device.

6. An electronic device having multiple antennas, comprising:
   a main antenna, located in the electronic device;
   an auxiliary antenna;
   a back cover and a metal heat component located on the back cover, wherein the auxiliary antenna is located on the metal heat component;
   a switching circuit, coupled with the main antenna and the auxiliary antenna;
   a communication module, coupled with the switching circuit; and
   a control circuit, coupled with the switching circuit, for controlling the switching circuit to electrically connect to the communication module and the main antenna, determining whether an operating state of the electronic device conforms to a preset usage situation,
   wherein when the operating state conforms to the preset usage situation, the control circuit controls the communication module to electrically connect to an auxiliary antenna of the electronic device, so that the communication module transmits and receives the radio frequency signal by the auxiliary antenna.

7. The electronic device according to claim 6, further combined with an expansion accessory, wherein the auxiliary antenna is located in the expansion accessory.

8. The electronic device according to claim 7, wherein the expansion accessory includes another communication module converting the radio frequency signal received by the auxiliary antenna to a digital signal, and the expansion accessory outputs the digital signal to the electronic device.

9. The electronic device according to claim 6, wherein the main antenna is located in a first area of the electronic device adjacent to a short side of the electronic device, and the auxiliary antenna is located in a second area of the electronic device adjacent to a long side of the electronic device.

10. The electronic device according to claim 9, wherein the step of the control circuit determining whether the operating state conforms to the preset usage situation is to determine whether the electronic device is operated in a horizontal operation mode or not.

11. The electronic device according to claim 10, wherein the step of the control circuit determining whether the operating state conforms to the preset usage situation is to determine whether the number of multi-touch signals from a touch screen of the electronic device within a preset time meets a first default value or not.

12. The electronic device according to claim 6, the step of the control circuit determining whether the operating state conforms to the preset usage situation is to determine whether a startup code of an application of the electronic device includes a preset character string or not.

13. The electronic device according to claim 6, wherein the auxiliary antenna is moveable relative to the back cover and in an extension state, the step of the control circuit determining whether the operating state conforms to the preset usage situation is determining whether the auxiliary antenna is in the extension state.

14. The electronic device according to claim 6, wherein the control circuit further determines whether a communication quality of the electronic device is less than a second default value or not when the communication module transmits and receives the radio frequency signal through the auxiliary antenna, and when the operating state conforms to the preset usage situation and the communication quality is less than the second default value, the control circuit controls the switching circuit to electrically connected to the communication module and the main antenna.

* * * * *